United States Patent
Berkland et al.

(10) Patent No.: US 9,416,731 B2
(45) Date of Patent: Aug. 16, 2016

(54) THERMOCOUPLE ASSEMBLY

(71) Applicant: General Electric Company, Schenectady, NY (US)

(72) Inventors: Richard Douglas Berkland, Spartanburg, SC (US); Shaun Christopher Barrett, Easley, SC (US); Michael Sean Markham, Ballston Spa, NY (US); Sean Cornelius O'Meara, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 428 days.

(21) Appl. No.: 14/068,373

(22) Filed: Oct. 31, 2013

(65) Prior Publication Data

US 2015/0114443 A1    Apr. 30, 2015

(51) Int. Cl.
*G01K 7/02* (2006.01)
*H01L 35/00* (2006.01)
*G01K 1/12* (2006.01)
*G01K 1/14* (2006.01)
*F02C 7/20* (2006.01)
*F01D 17/08* (2006.01)
*F01D 25/30* (2006.01)
*G01K 1/08* (2006.01)

(52) U.S. Cl.
CPC ............... *F02C 7/20* (2013.01); *F01D 17/085* (2013.01); *F01D 25/30* (2013.01); *G01K 1/08* (2013.01); *G01K 7/02* (2013.01); *G01K 2205/04* (2013.01)

(58) Field of Classification Search
CPC ............. G01K 7/02; G01K 1/12; G01K 1/14; H01L 35/00
USPC .................. 374/141, 179, 163, 208, 139, 140; 136/200
See application file for complete search history.

(56) References Cited

U.S. PATENT DOCUMENTS

| | | | | | |
|---|---|---|---|---|---|
| 1,615,451 | A | * | 1/1927 | Harrison | G01K 1/12 136/232 |
| 3,353,808 | A | * | 11/1967 | Norburn | C21C 5/4613 136/235 |
| 3,580,744 | A | * | 5/1971 | Ingouye et al. | 136/234 |
| 3,643,509 | A | * | 2/1972 | Surinx | C21C 5/4673 136/234 |
| 3,923,552 | A | * | 12/1975 | Parris | G01K 1/08 136/227 |
| 3,935,032 | A | * | 1/1976 | Brandeberry | G01K 1/08 136/230 |
| 4,038,105 | A | * | 7/1977 | Brandeberry | G01K 1/12 136/231 |
| 4,358,630 | A | * | 11/1982 | Falk | G01K 1/125 136/234 |
| 4,830,515 | A | * | 5/1989 | Cortes | G01K 13/02 136/221 |
| 5,197,805 | A | * | 3/1993 | Wilson | G01K 1/125 136/230 |
| 5,399,019 | A | * | 3/1995 | Kourtides | G01K 7/04 136/230 |
| 5,474,618 | A | * | 12/1995 | Allaire | H01L 35/32 136/201 |

(Continued)

*Primary Examiner* — Gail Kaplan Verbitsky
(74) *Attorney, Agent, or Firm* — Ernest G. Cusick; Frank A. Landgraff

(57) ABSTRACT

A thermocouple assembly includes a thermocouple probe fixedly contained within a probe insulation sheath. Also included is a protection tube having a first end, a second end, and a hollow portion extending in a longitudinal direction of the protection tube from the first end to the second end, the hollow portion configured to receive the thermocouple probe and the probe insulation sheath therein. Further included is a radiation shield integrally formed with the protection tube proximate the second end of the protection tube. Yet further included is a nut configured to threadingly engage a threaded portion of the protection tube proximate the first end of the protection tube, the nut configured to positionally fix the thermocouple probe and the probe insulation sheath upon engagement with the protection tube.

14 Claims, 4 Drawing Sheets

(56) References Cited

U.S. PATENT DOCUMENTS

| | | | | |
|---|---|---|---|---|
| 5,483,041 A * | 1/1996 | Peck | | H01L 21/67115 219/385 |
| 5,741,072 A * | 4/1998 | Yamaguchi | | G01K 7/023 136/232 |
| 6,040,518 A * | 3/2000 | Kinnard | | H01L 21/67248 136/201 |
| 6,776,524 B2 | 8/2004 | Park et al. | | |
| 6,830,374 B1 * | 12/2004 | Gray | | G01K 7/02 136/230 |
| 6,857,766 B2 | 2/2005 | Verdi | | |
| 7,458,718 B2 * | 12/2008 | Krishnamurthy | | G01K 1/16 374/144 |
| 7,465,086 B1 * | 12/2008 | Foreman, Jr. | | G01K 1/08 136/200 |
| 7,824,100 B2 * | 11/2010 | Sakami | | G01K 1/20 374/1 |
| 7,882,620 B2 * | 2/2011 | Allaire | | E02D 29/0258 136/230 |
| 8,770,837 B2 * | 7/2014 | Egan | | G01K 1/08 374/141 |
| 2009/0041084 A1 * | 2/2009 | Sakami | | G01K 1/20 374/179 |
| 2009/0268779 A1 * | 10/2009 | Hotta | | G01K 1/10 374/179 |
| 2011/0150033 A1 * | 6/2011 | Egan | | G01K 1/08 374/141 |
| 2014/0105248 A1 * | 4/2014 | Daily | | G01K 1/143 374/179 |
| 2015/0185084 A1 * | 7/2015 | Hatlen | | G01K 1/08 374/208 |
| 2015/0233768 A1 * | 8/2015 | Lantzsch | | G01K 1/08 374/179 |
| 2016/0003685 A1 * | 1/2016 | Walla | | G01K 1/143 374/208 |

* cited by examiner

THERMOCOUPLE ASSEMBLY

BACKGROUND OF THE INVENTION

The subject matter disclosed herein relates to a thermocouple assembly, and more particularly to a thermocouple assembly that may be employed in conjunction with turbine systems, such as a gas turbine engine.

Thermocouple assemblies are employed to measure temperatures of a wide variety of applications in numerous industries. A turbine system is an example of an application that relies on thermocouple assemblies to reliably measure temperatures of system components. For example, a gas turbine engine that generates a stream of hot exhaust gases may rely on thermocouple assemblies to measure temperatures within components, such as within a turbine exhaust diffuser.

Certain thermocouple assemblies require the insertion of a thermocouple probe into a protection tube with radiation shield located within a temperature detection region. Proper insertion of the thermocouple probe requires precise insertion depth and orientation. Improper insertion may subject the thermocouple probe to excessive vibration and relative motion between the thermocouple probe and the radiation shield, thereby leading to damage to the thermocouple probe.

BRIEF DESCRIPTION OF THE INVENTION

According to one aspect of the invention, a thermocouple assembly includes a thermocouple probe fixedly contained within a probe insulation sheath. Also included is a protection tube having a first end, a second end, and a hollow portion extending in a longitudinal direction of the protection tube from the first end to the second end, the hollow portion configured to receive the thermocouple probe and the probe insulation sheath therein. Further included is a radiation shield integrally formed with the protection tube proximate the second end of the protection tube. Yet further included is a nut configured to threadingly engage a threaded portion of the protection tube proximate the first end of the protection tube, the nut configured to positionally fix the thermocouple probe and the probe insulation sheath upon engagement with the protection tube.

According to another aspect of the invention, a thermocouple assembly for a turbine exhaust diffuser includes a diffuser flow path defined by an inner surface of an outer wall of the turbine exhaust diffuser. Also included is a thermocouple probe configured to extend into the diffuser flow path. Further included is a protection tube having a first end, a second end, and a hollow portion extending in a longitudinal direction of the protection tube from the first end to the second end, the hollow portion configured to receive the thermocouple probe therein. Yet further included is a flange integrally formed with the protection tube and configured to be operatively coupled to an outer surface of an outer wall of the turbine exhaust diffuser. Also included is a nut configured to threadingly engage a threaded portion of the protection tube proximate the first end of the protection tube, the nut configured to positionally fix the thermocouple probe in a radial direction upon engagement with the protection tube.

According to yet another aspect of the invention, a gas turbine engine includes a thermocouple assembly configured to measure temperatures of a section of the gas turbine engine, the thermocouple assembly comprising a thermocouple probe fixedly contained within a probe insulation sheath, wherein the thermocouple probe is retained within a hollow portion of a protection tube and fixedly connected to the protection tube at a single location.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The terms "axial" and "axially" as used in this application refer to directions and orientations extending substantially parallel to a center longitudinal axis of a turbine system. The terms "radial" and "radially" as used in this application refer to directions and orientations extending substantially orthogonally to the center longitudinal axis of the turbine system. The terms "upstream" and "downstream" as used in this application refer to directions and orientations relative to an axial flow direction with respect to the center longitudinal axis of the turbine system.

Figure 1:
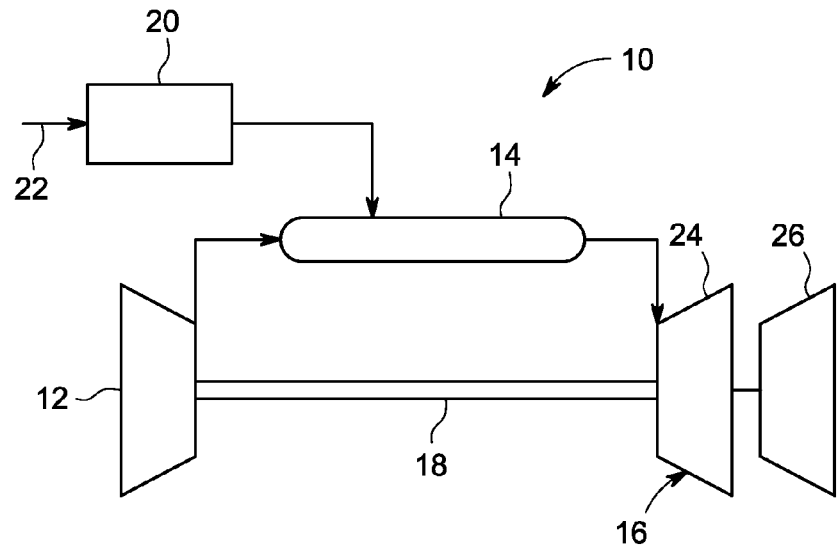
FIG. 1 is a schematic illustration of a gas turbine engine.

Referring to FIG. 1, a turbine system, such as a gas turbine engine, for example, is schematically illustrated and generally referred to with reference numeral 10. The gas turbine engine 10 includes a compressor section 12, a combustor section 14, a turbine section 16, a shaft 18 and a fuel nozzle 20. It is to be appreciated that one embodiment of the gas turbine engine 10 may include a plurality of compressors 12, combustors 14, turbines 16, shafts 18 and fuel nozzles 20. The compressor section 12 and the turbine section 16 are coupled by the shaft 18. The shaft 18 may be a single shaft or a plurality of shaft segments coupled together to form the shaft 18.

The combustor section 14 uses a combustible liquid and/or gas fuel, such as natural gas or a hydrogen rich synthetic gas, to run the gas turbine engine 10. For example, fuel nozzles 20 are in fluid communication with an air supply and a fuel supply 22. The fuel nozzles 20 create an air-fuel mixture, and discharge the air-fuel mixture into the combustor section 14, thereby causing a combustion that creates a hot pressurized exhaust gas. The combustor section 14 directs the hot pressurized gas through a transition piece into a turbine nozzle (or "stage one nozzle"), and other stages of buckets and nozzles causing rotation of turbine blades within an outer casing 24 of the turbine section 16. Subsequently, the hot pressurized gas is sent from the turbine section 16 to an exhaust diffuser 26 that is operably coupled to a portion of the turbine section, such as the outer casing 24, for example.

Figure 2:
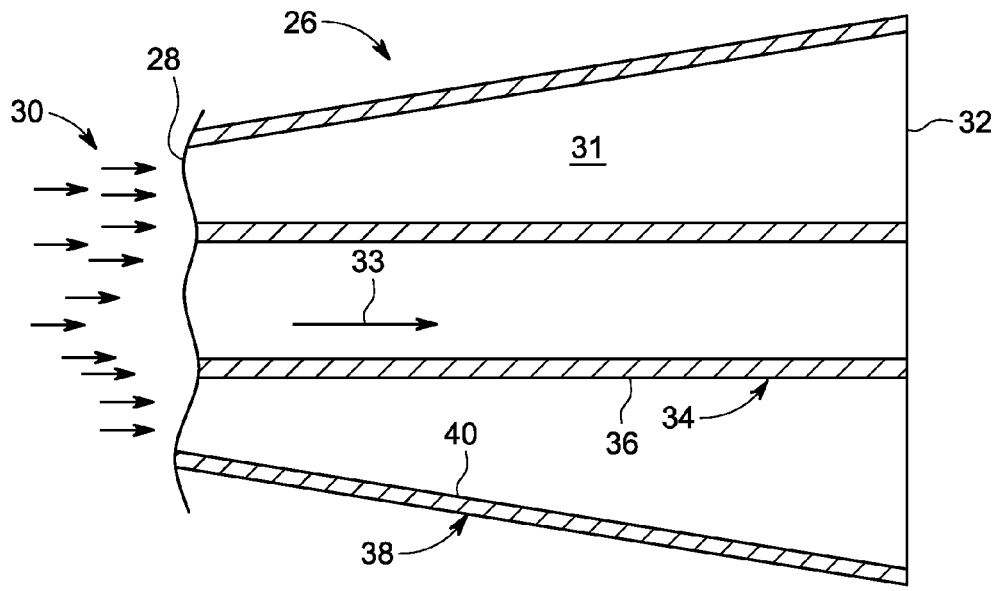
FIG. 2 is a cross-sectional view of a turbine exhaust diffuser of the gas turbine engine.

Referring now to FIG. 2, a side, cross-sectional view of the exhaust diffuser 26 is illustrated. The exhaust diffuser 26 includes an inlet 28 configured to receive an exhaust fluid 30 from the turbine section 16. An outlet 32 is disposed at a downstream location relative to the inlet 28. Extending relatively axially along a main flow direction 33 of the exhaust diffuser 26 at least partially between the inlet 28 and the outlet 32 is an inner barrel 34 that includes an outer surface 36. Spaced radially outwardly from the inner barrel 34, and more specifically radially outwardly from the outer surface 36, is an outer wall 38 having an inner surface 40. The outer wall 38 is arranged in a relatively diverging configuration, such that kinetic energy of the exhaust fluid 30 is lessened subsequent to entering the inlet 28 of the exhaust diffuser 26. More particularly, a transfer of dynamic pressure to static pressure occurs within the exhaust diffuser 26 due to the diverging configuration of the outer wall 38. The exhaust fluid 30 flows through a diffuser flow path 31 defined by the outer surface 36 of the inner barrel 34 and the inner surface 40 of the outer wall 38.

Figure 3:
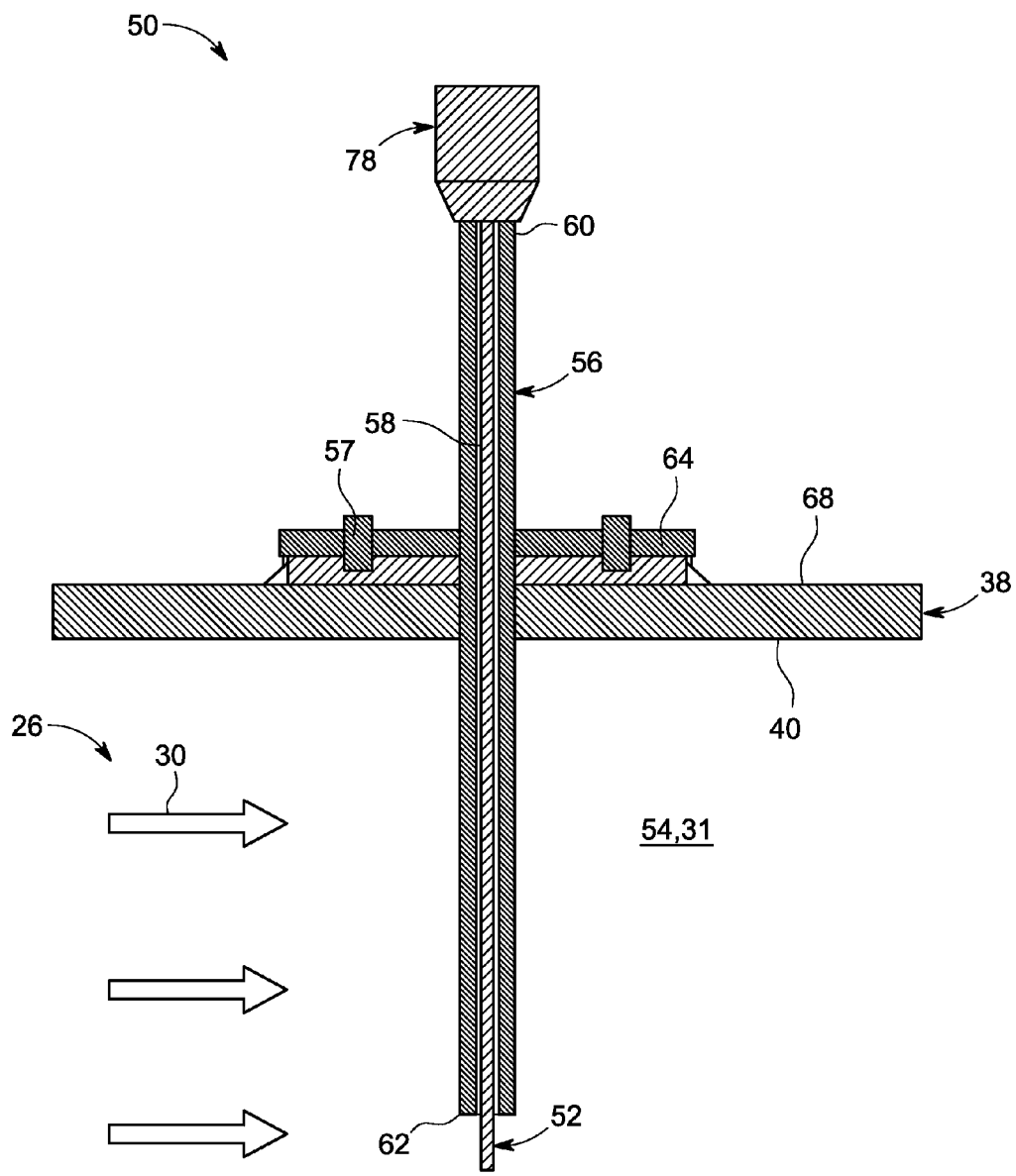
FIG. 3 is a schematic cross-sectional view of a thermocouple assembly coupled to the turbine exhaust diffuser.

Referring to FIG. 3, a thermocouple assembly 50 is illustrated schematically in an assembled condition with the exhaust diffuser 26. The thermocouple assembly 50 includes a thermocouple probe 52 extending into an interior region 54 (i.e., diffuser flow path 31) of the exhaust diffuser 26 and is configured to detect the temperature within the interior region 54. The thermocouple probe 52 is at least partially disposed within, and retained by, a protection tube 56. More particularly, the thermocouple probe 52 is at least partially disposed within a hollow portion 58 of the protection tube 56 that extends from a first end 60 of the protection tube 56 to a second end 62 of the protection tube 56. As shown, the protection tube 56 includes a flange 64 configured to operatively couple the protection tube 56, and consequently the thermocouple assembly 50, to an outer surface 68 of the outer wall 38 of the exhaust diffuser 26. The protection tube 56 may be secured to the outer surface 68 in any suitable manner, such as with welding or mechanical fasteners, for example. In the illustrated embodiment, a pair of bolts 57 or the like is generally illustrated.

Although a turbine exhaust diffuser is illustrated and described in conjunction with embodiments of the thermocouple assembly 50, it is to be appreciated that the thermocouple assembly 50 may be employed with any component of the gas turbine engine 10. Furthermore, the thermocouple assembly 50 may be used in any industry or application benefiting from temperature readings within components.

Figure 4:
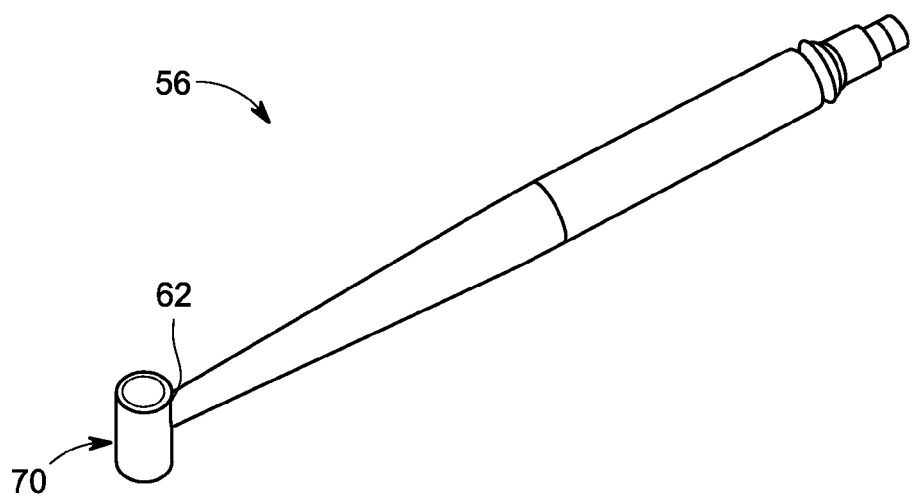
FIG. 4 is a perspective view of a protection tube of the thermocouple assembly.
Figure 5:
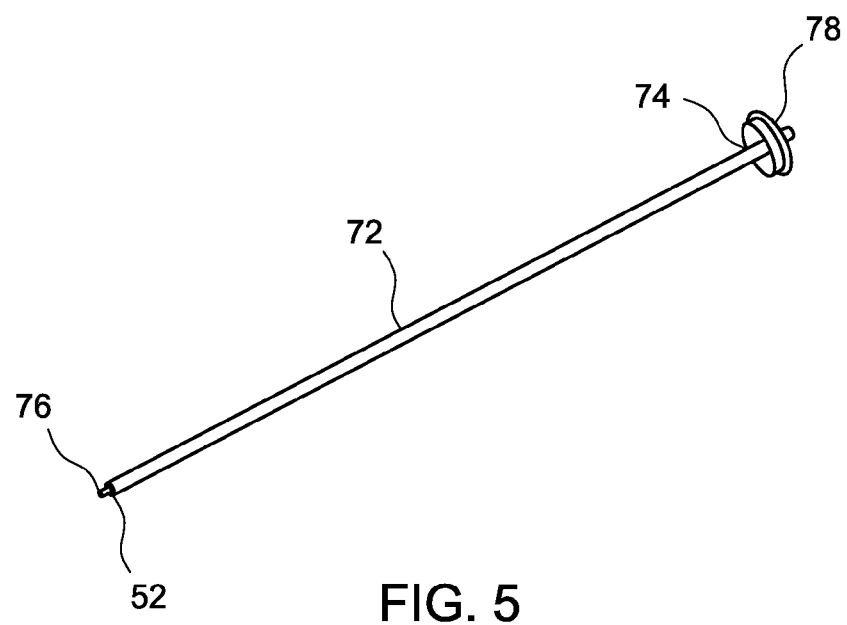
FIG. 5 is a perspective view of a thermocouple probe of the thermocouple assembly.

Referring to FIGS. 4 and 5, the thermocouple assembly 50 is illustrated in greater detail in a disassembled condition. The protection tube 56 is illustrated in FIG. 4 and the thermocouple probe 52 is shown in FIG. 5. The protection tube 56 includes a radiation shield 70 disposed proximate the second end 62 of the protection tube 56. The radiation shield 70 is typically integrally formed with the protection tube 56, however, it is contemplated that separate formation and coupling of the components may be suitable. The radiation shield 70 is shown as a tubular member that reduces erroneous temperature readings by the thermocouple probe 52 by shielding the thermocouple probe 52 from black body radiation, but alternative geometries of the radiation shield 70 may be employed.

The thermocouple probe 52 is fixedly contained within a probe insulation sheath 72 formed of a magnesium oxide material configured to insulate the thermocouple probe 52. The thermocouple probe 52 may be operatively coupled to, or integrally formed within, the probe insulation sheath 72. In one embodiment, the thermocouple probe 52 is comprised of a section of metal-sheathed, mineral-insulated (MI) thermocouple cable. That is, the thermocouple cable has a metal sheath, compacted magnesium oxide powder insulator, and thermocouple wires which are formed into a junction at the sensing end, and the cable is capped at this end. In another embodiment, the probe insulation sheath 72 forms a second metal sheath over the complete thermocouple probe 52 (e.g., wires, insulation and sheath inclusive), and the probe insulation sheath 72 is only be fixed to the thermocouple probe 52 at the first end 60. As shown, the thermocouple probe 52 extends from a first thermocouple end 74 to a second thermocouple end 76. The second thermocouple end 76 protrudes slightly from an end of the probe insulation sheath 72 and extends into the interior space of the radiation shield 70 in an assembled condition of the thermocouple assembly 50, as will be described below. Proximate the first end 60 of the thermocouple probe 52 is a thermocouple connector 78.

Figure 6:
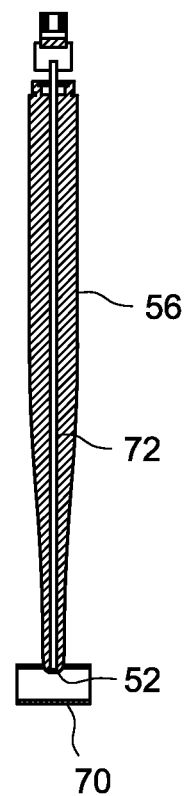
FIG. 6 is a cross-sectional view of the thermocouple assembly in a partially assembled condition.

Referring to FIG. 6, the thermocouple probe 52, probe insulation sheath 72, and the protection tube 56 are illustrated in an assembled condition. In the assembled condition, the thermocouple probe 52 and the probe insulation sheath 72 are disposed within the hollow portion 58 of the protection tube 56 and the second end 76 of the thermocouple probe 52 is disposed within the radiation shield 70.

Figure 7:
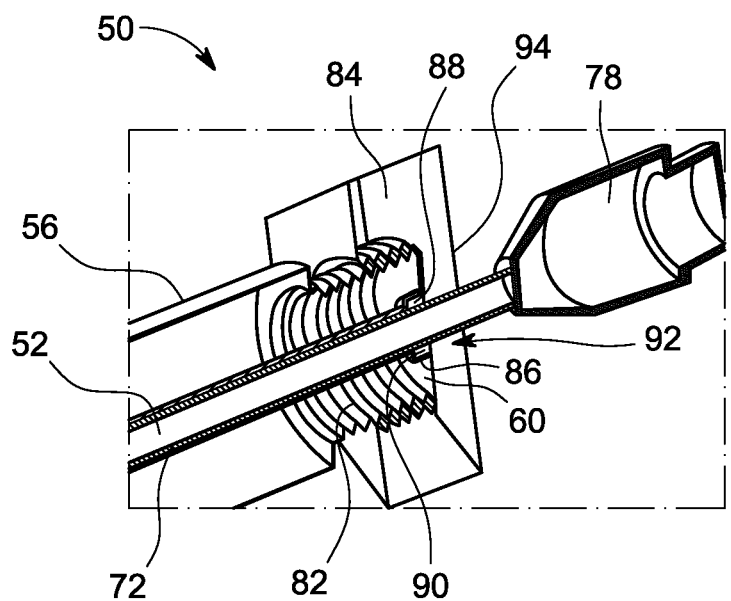
FIG. 7 is a perspective, cross-sectional view of a portion of the thermocouple assembly.

Referring to FIG. 7, with continued reference to FIG. 6, reliable depth positioning and orientation of the thermocouple probe 52 into the protection tube 56 is important based on the harsh environment and operating conditions that the thermocouple assembly 50 is subjected to. Depth positioning refers to the depth of insertion of the thermocouple probe 52 in a radial direction, i.e., in a longitudinal direction 80 of the protection tube 56.

FIG. 7 is an enlarged view of the thermocouple assembly 50 proximate the first end 60 of the protection tube 56. The protection tube 56 includes a threaded portion 82 proximate the first end 60 of the protection tube 56 that is configured to threadingly engage a nut 84. Prior to engagement of the nut 84 with the threaded portion 82, the thermocouple probe 52 and the probe insulation sheath 72 are inserted into the hollow portion 58 of the protection tube 56. A desired insertion depth of the thermocouple probe 52 is ensured by a shoulder-bore arrangement configured to limit an insertion depth of the thermocouple probe 52. Specifically, the protection tube 56 includes a counter bore 86 that is sized to receive a shoulder 88 of the probe insulation sheath 72. The arrangement defines an insertion depth of the thermocouple probe 52 in the longitudinal direction 80 of the protection tube 56. Upon engagement of the nut 84 with the threaded portion 82, the nut 84 exerts a clamping force on the thermocouple probe 52. More particularly, a bottom surface 90 of a retaining portion 92 (e.g., bore) of the nut 84 engages, or is in close contact with, the shoulder 88 of the probe insulation sheath 72, thereby avoiding withdrawal of the thermocouple probe 52. In one embodiment, the nut 84 is held in place with one or more locking wires (not illustrated). The nut 84 may be engaged with the threaded portion 82 via a straight thread until a stop is reached. To avoid backing out of the nut 84, a locking wire may be present on each side of the nut 84. Each wire is threaded through respective holes in the radiation shield 70 and the nut 84 to hold the nut 84 in place.

Advantageously, the above-described embodiments provide an error-proof structure to define desired immersion depth, which is tuned to a highly guarded temperature coefficient of a control system associated with the thermocouple assembly 50. Additionally, specific immersion and profile of the instrument depth reduces vortex effects within the exhaust diffuser 26. Precise depth insertion also reduces the likelihood of damage or destruction of the thermocouple probe 52.

In the event of necessary removal and/or replacement of the thermocouple probe 52, the nut 84 is simply rotated. Rotation of the nut 84 advantageously leads to a top surface 94 of the nut 84 imparting a force on the thermocouple connector 78, which is integral to the thermocouple probe 52 and/or the probe insulation sheath 72, as described above. This force is particularly advantageous in the case of a stuck thermocouple probe 52. In this manner, the nut 84 acts as a screw-jack that facilitates removal of the thermocouple probe 52.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A thermocouple assembly comprising:
a thermocouple probe fixedly contained within a probe insulation sheath;
a protection tube having a first end, a second end, and a hollow portion extending in a longitudinal direction of the protection tube from the first end to the second end, the hollow portion configured to receive the thermocouple probe and the probe insulation sheath therein;
a radiation shield integrally formed with the protection tube proximate the second end of the protection tube; and
a nut configured to threadingly engage a threaded portion of the protection tube proximate the first end of the protection tube, the nut configured to positionally fix the thermocouple probe and the probe insulation sheath upon engagement with the protection tube, further comprising a counter bore formed proximate the first end of the protection tube, the counter bore configured to define an insertion depth of the thermocouple probe in the longitudinal direction of the protection tube, wherein the probe insulation sheath includes a shoulder region configured to seat within the counter bore in a fully inserted condition of the thermocouple probe.

2. The thermocouple assembly of claim 1, wherein the nut includes a retaining portion configured to retain the shoulder region of the probe insulation sheath to avoid withdrawal of the thermocouple probe.

3. The thermocouple assembly of claim 1, wherein the thermocouple probe includes a thermocouple connector operatively coupled to a first thermocouple end.

4. The thermocouple assembly of claim 3, wherein the nut is configured to impart a force on the thermocouple connector upon disengagement of the nut from the threaded portion of the protection tube, the force facilitating withdrawal of the thermocouple probe from the hollow portion of the protection tube.

5. The thermocouple assembly of claim 1, wherein the thermocouple probe includes a first thermocouple end and a second thermocouple end, the second thermocouple end configured to extend into an interior portion of a component for measuring a temperature of the interior portion.

6. The thermocouple assembly of claim 5, further comprising a flange integrally formed with the protection tube and configured to be operatively coupled to an outer surface of an outer wall of the component.

7. A thermocouple assembly for a turbine exhaust diffuser comprising:
a diffuser flow path defined by an inner surface of an outer wall of the turbine exhaust diffuser;
a thermocouple probe configured to extend into the diffuser flow path;
a protection tube having a first end, a second end, and a hollow portion extending in a longitudinal direction of the protection tube from the first end to the second end, the hollow portion configured to receive the thermocouple probe therein;
a flange integrally formed with the protection tube and configured to be operatively coupled to an outer surface of an outer wall of the turbine exhaust diffuser; and
a nut configured to threadingly engage a threaded portion of the protection tube proximate the first end of the protection tube, the nut configured to positionally fix the thermocouple probe in a radial direction upon engagement with the protection tube, further comprising a counter bore formed proximate the first end of the protection tube, the counter bore configured to define an insertion depth of the thermocouple probe in the longitudinal direction of the protection tube, further comprising a probe insulation sheath fixedly containing the thermocouple probe therein, wherein the probe insulation sheath includes a shoulder region configured to seat within the counter bore in a fully inserted condition of the thermocouple probe.

8. The thermocouple assembly of claim 7, wherein the nut includes a retaining portion configured to retain the shoulder region of the probe insulation sheath to prevent withdrawal of the thermocouple probe.

9. The thermocouple assembly of claim 7, wherein the thermocouple probe includes a thermocouple connector operatively coupled to a first thermocouple end.

10. The thermocouple assembly of claim 9, wherein the nut is configured to impart a force on the thermocouple connector upon disengagement of the nut from the threaded portion of the protection tube, the force facilitating withdrawal of the thermocouple probe from the hollow portion of the protection tube.

11. A gas turbine engine comprising:
a thermocouple assembly configured to measure temperatures of a section of the gas turbine engine, the thermocouple assembly comprising a thermocouple probe fixedly contained within a probe insulation sheath, wherein the thermocouple probe is retained within a hollow portion of a protection tube and fixedly connected to the protection tube at a single location, further comprising:
a counter bore formed proximate a first end of the protection tube, the counter bore configured to define an insertion depth of the thermocouple probe in a longitudinal direction of the protection tube;
a shoulder region of the probe insulation sheath configured to seat within the counter bore in a fully inserted condition of the thermocouple probe; and
a nut having a retaining portion configured to retain the shoulder region of the probe insulation sheath to prevent withdrawal of the thermocouple probe, wherein the single location comprises a threaded portion of the protection tube located proximate a first end of the protection tube, wherein the thermocouple probe is clamped.

12. The gas turbine engine of claim 11, further comprising a flange integrally formed with the protection tube and configured to be operatively coupled to an outer surface of an outer wall of the section of the gas turbine engine.

13. The gas turbine engine of claim 11, wherein the thermocouple probe includes a thermocouple connector operatively coupled to a first thermocouple end.

14. The gas turbine engine of claim 13, wherein the nut is configured to impart a force on the thermocouple connector upon disengagement of the nut from the threaded portion of the protection tube, the force facilitating withdrawal of the thermocouple probe from the hollow portion of the protection tube.

\* \* \* \* \*